April 5, 1927.

C. W. CUTTER 1,623,234

GRADE INDICATOR

Filed Oct. 29, 1925

INVENTOR.
CHARLES W. CUTTER.
BY.
H. A. Druckman
ATTORNEY.

Patented Apr. 5, 1927.

1,623,234

UNITED STATES PATENT OFFICE.

CHARLES W. CUTTER, OF LONG BEACH, CALIFORNIA.

GRADE INDICATOR.

Application filed October 29, 1925. Serial No. 65,582.

This invention relates to grade indicators particularly applicable to motor vehicles, by means of which the amount of an ascending or descending grade may be instantly seen.

An object of my invention is to provide a grade indicator which may be readily attached to the vehicle instrument board.

Other objects are to provide a grade indicator which is simple in construction, inexpensive to manufacture, and efficient in operation.

Other objects, advantages and features of invention may appear from the accompanying drawing, the subjoined detailed description and the appended claim.

In the drawing illustrating my invention:

Figure 1:
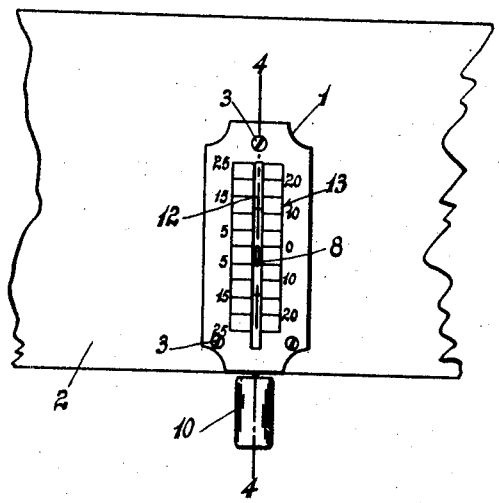
Fig. 1 is a face view of my indicator mounted on an instrument board of a vehicle.
Figure 2:
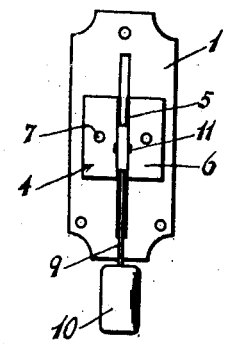
Fig. 2 is a rear view of my indicator.
Figure 3:
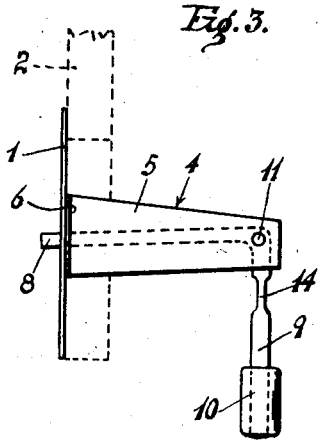
Fig. 3 is a side view of the same.
Figure 4:
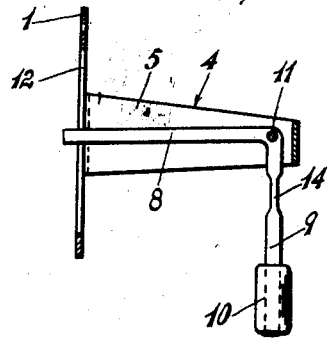
Fig. 4 is a sectional view on line 4—4, Fig. 1.

Referring more particularly to the drawing, the numeral 1 indicates the substantially rectangular face plate of my indicator which is adapted to be mounted on the instrument board 2 by means of screws 3 extending therethrough.

A bracket 4 extends rearwardly from the plate 1, and preferably consists of a stamping formed of a single strip of metal. This strip is bent at the center to form the spaced arms 5, 5, and the arms are again bent outwardly at their forward ends to provide the flanges 6, 6, through which rivets 7 extend into the face plate 1, thus securing the bracket in position.

An indicating finger 8, has a weight arm 9 depending therefrom, to which weight arm a weight 10 is secured. The finger 8 and arm 9 are preferably formed as a stamping from a single piece of metal, and together form a bell crank lever. The finger and arm are pivoted to the bracket 4 by a pin 11, adjacent the rear of said bracket.

A slot 12 is formed in the face plate 1 through which the finger 8 extends, and a scale 13 is provided on said plate, extending upwardly and downwardly from 0 to 25, to indicate a rising or falling grade.

When the vehicle is standing level the finger 8 should point to 0. To compensate for the various tilts of the instrument board on various cars and to adjust the finger 8 so that it points to 0 when the car is level I provide a narrow neck 14 in the arm 9 so that the arm may be bent at this point, and thus adjust the finger.

In mounting my indicator a slot is cut in the instrument board 2 through which the bracket 4 extends. The plate 1 is secured to the board as described and the finger 8 is adjusted to 0. Now as the vehicle tilts upwardly or downwardly the finger 8 will move upwardly or downwardly over the scale 13 to indicate the percent of the grade traveled.

Having described my invention I claim:

A grade indicator comprising a face plate having a slot therein, a scale on said plate, a bracket secured to said plate, an indicating finger pivoted to said bracket, an arm integral with said finger and depending therefrom, and a weight on said arm, said arm having a reduced neck portion thereon, whereby the weight may be adjusted to correct the setting of the finger by flexing the arm at said neck portion.

In testimony whereof I affix my signature.

CHARLES W. CUTTER.